(No Model.)

D. W. MICKEY.
CHECK HOOK.

No. 484,665. Patented Oct. 18, 1892.

Witnesses

Inventor
David W. Mickey
By his Attorney Henry Wise Garnett

UNITED STATES PATENT OFFICE.

DAVID WOODS MICKEY, OF WHITE CITY, KANSAS.

CHECK-HOOK.

SPECIFICATION forming part of Letters Patent No. 484,665, dated October 18, 1892.

Application filed February 12, 1892. Serial No. 421,248. (No model.)

*To all whom it may concern:*

Be it known that I, DAVID WOODS MICKEY, a citizen of the United States, residing at White City, in the county of Morris and State of Kansas, have invented certain new and useful Improvements in Check or Bridle Rein Hooks or Holders; and I do hereby declare the following to be a full, clear, and exact description of the invention, such as will enable others skilled in the art to which it appertains to make and use the same.

My invention relates to an improved bridle or check rein hook or holder; and it has for its object to prevent the accidental detachment of the check or bridle rein by the horse or otherwise and to remove strain from the check or bridle rein, consequently "easing up" thereon; and it consists in the novel combination and arrangement of parts, substantially as hereinafter more fully disclosed, and pointed out in the claims.

Figure 1:
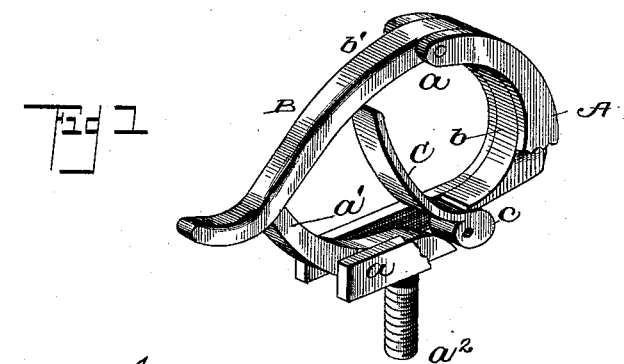
Figure 2:
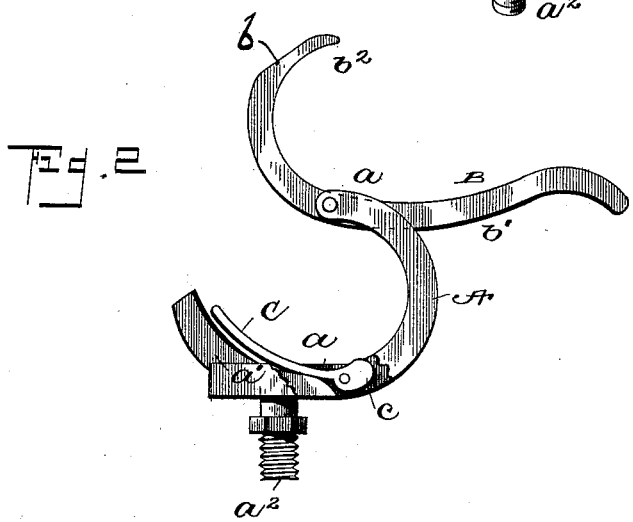
Figure 3:
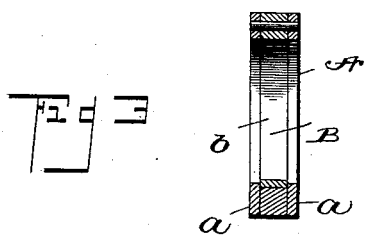

In the accompanying drawings, Figure 1 is a broken perspective view of my improved check or bridle rein holder or hook in its normal position. Fig. 2 is a broken side view thereof, showing it in the position to receive the check or bridle rein. Fig. 3 is a vertical cross-section of the same.

In the embodiment of my invention I employ a bifurcated or two-part hook A, of an approximately C shape, with its terminals $a$ $a'$, however, reversely presented, and having a pendent integral screw $a^2$ for its suitable attachment to the back-band of the harness.

B is a hook-shaped dog pivoted a short distance from its inner hooked end between the upper ends or terminals $a$ $a'$ of the arms of the bifurcated hook A, and having its said inner hooked end flat upon its back otherwise convex edge, as at $b$, and inclined upward and forward slightly the greater portion of its length, as at $b'$, the extreme rear end portion thereof, however, being reversely inclined, also, slightly, as at $b^2$, the purpose of which will appear farther on.

C is a latch or guard, preferably a slightly-curved thin flat metallic piece, pivoted near its inner end between and about centrally of the arms of the hook A, the extreme inner end thereof being provided with a rounded cam-like surface $c$, standing in the plane of the movement of the inner end portion of the dog B and adapted to be first engaged by the greater inclined flat surface thereof and finally by the lesser reversely-inclined flat surface of the same. By the conjoint action of this engagement of parts and the weight of the longer arm of the dog, normally resting upon the terminal $a'$ of the hook A, the latch or guard C is automatically thrown up into the position of Fig. 1 and automatically locked against rearward movement until the dog itself is lifted by the hand, thus automatically securing the check or bridle rein, when inserted therein, from possible accidental detachment or removal by the action of the horse or otherwise.

Having thus fully described my invention, what I claim, and desire to secure by Letters Patent, is—

1. The combination of a hook, a dog pivoted near its hook-ended portion to the upper forward end of said hook and having its rear end portion adapted to rest upon the rear end of said hook, and a latch pivoted to said hook and having its free end adapted to engage the under side of the upper portion of said dog and its pivoted end provided with a cam to engage the lower forward end of the dog, substantially as set forth.

2. The bridle or check rein holder having the bifurcated hook, in combination with the hook-ended dog having a flat inner end portion provided with a greater inclined surface and a lesser reversely-inclined surface at its extreme rear end and the latch or guard pivoted between and about centrally of the arms of said hook and having its extreme inner end provided with a rounded shoulder or cam-like portion adapted to be engaged by said dog, substantially as set forth.

In testimony whereof I have hereunto signed my name this 2d day of February, A. D. 1892, in presence of two witnesses.

DAVID WOODS MICKEY.

Witnesses:
R. A. GALBRAITH,
J. P. ZIMMERMAN.